(12) United States Patent
Park

(10) Patent No.: US 8,666,228 B2
(45) Date of Patent: Mar. 4, 2014

(54) OPERATING METHOD OF A BROADCASTING RECEIVER STORING A BROADCASTING PROGRAM AND PROVIDING THUMBNAIL IMAGES OF A CHANNEL-SWITCHED BROADCASTING PROGRAM WHILE STORING THE BROADCASTING PROGRAM, AND A CORRESPONDING BROADCASTING RECEIVER

(75) Inventor: Dae Suk Park, Gumi-si (KR)

(73) Assignee: LG Electronics Inc., Seoul (KR)

( * ) Notice: Subject to any disclaimer, the term of this patent is extended or adjusted under 35 U.S.C. 154(b) by 929 days.

(21) Appl. No.: 12/407,573

(22) Filed: Mar. 19, 2009

(65) Prior Publication Data
US 2010/0166393 A1 Jul. 1, 2010

(30) Foreign Application Priority Data

Dec. 29, 2008 (KR) .......................... 10-2008-0135822

(51) Int. Cl.
| | |
|---|---|
| *H04N 5/93* | (2006.01) |
| *H04N 21/472* | (2011.01) |
| *G06F 3/0481* | (2013.01) |

(52) U.S. Cl.
CPC ...... *H04N 21/47217* (2013.01); *G06F 3/04817* (2013.01)
USPC ...................... 386/291; 348/333.05; 715/836

(58) Field of Classification Search
USPC ....................................................... 386/291
See application file for complete search history.

(56) References Cited

U.S. PATENT DOCUMENTS

| 7,624,411 | B2 * | 11/2009 | Ellis et al. ........................ 725/39 |
|---|---|---|---|
| 2002/0037159 | A1 * | 3/2002 | Goto et al. ....................... 386/69 |
| 2004/0045036 | A1 * | 3/2004 | Terasaki ......................... 725/116 |
| 2004/0120693 | A1 * | 6/2004 | Kawai .............................. 386/83 |
| 2006/0017980 | A1 * | 1/2006 | Yatabe et al. .................. 358/296 |
| 2006/0168542 | A1 * | 7/2006 | Abanami et al. .............. 715/821 |
| 2007/0050813 | A1 | 3/2007 | Lee |
| 2007/0133938 | A1 * | 6/2007 | Park ................................ 386/46 |
| 2007/0140658 | A1 * | 6/2007 | Han ................................ 386/95 |
| 2008/0159708 | A1 * | 7/2008 | Kazama et al. ................. 386/69 |
| 2008/0225167 | A1 * | 9/2008 | Beermann ..................... 348/554 |
| 2009/0028513 | A1 * | 1/2009 | Nosaka .......................... 386/46 |
| 2010/0262912 | A1 * | 10/2010 | Cha .............................. 715/719 |

FOREIGN PATENT DOCUMENTS

EP 1 971 142 A1 9/2008

* cited by examiner

*Primary Examiner* — Matthew Henning
(74) *Attorney, Agent, or Firm* — Birch, Stewart, Kolasch & Birch, LLP

(57) ABSTRACT

An operating method of a broadcasting receiver storing a broadcasting program and providing thumbnail images of a channel-switched broadcasting program during storing the broadcasting program and a broadcasting receiver enabling of the method, thus providing a representative thumbnail image of a channel-switched broadcasting program during storing of the broadcasting program, making it possible to improve a user's convenience by providing information on what the channel-switched broadcasting program is as well as by extracting and outputting thumbnail images from the broadcasting program.

3 Claims, 5 Drawing Sheets

OPERATING METHOD OF A BROADCASTING RECEIVER STORING A BROADCASTING PROGRAM AND PROVIDING THUMBNAIL IMAGES OF A CHANNEL-SWITCHED BROADCASTING PROGRAM WHILE STORING THE BROADCASTING PROGRAM, AND A CORRESPONDING BROADCASTING RECEIVER

CROSS-REFERENCE TO RELATED APPLICATION

This application claims the benefit of Korean Patent Application No. 10-2008-0135822, filed on Dec. 29, 2008, which is hereby incorporated by reference in its entirety as if fully set forth herein.

BACKGROUND OF THE INVENTION

1. Technical Field

The present embodiment relates to an operating method of a broadcasting receiver storing a broadcasting program and a broadcasting receiving enabling of the method, and more particularly to an operating method of a broadcasting receiver when a channel is switched during the storing of a broadcasting program, and a broadcasting receiver enabling of the same.

2. Background Art

Today, the development of a broadcasting receiver having a personal video recorder (PVR) function that records and stores a broadcasting program, after receiving it, has been accelerated and the user's necessity for search for recorded things has been also increased as the capacity of the recorded things is increased.

In this regard, a conventional broadcasting receiver has proposed a method that searches recorded things by outputting progress bars matching with the progresses of the recorded things.

However, the recorded things are not easily searched using only the progress bars so that there is an acute demand for the development of a broadcasting receiver with which a user can more conveniently search recorded things.

In particular, in a broadcasting receiver using a time-shift function, a user occasionally intends to comprehend the recorded content by searching recorded things recorded using the time-shift function, however the conventional broadcasting receiver has failed to reflect such user's needs.

Therefore, in order to solve such a conventional problem, there is a demand for the development of an operating method of a broadcasting receiver that allows a user to understand the content of the stored broadcasting program more easily in a broadcasting receiver adopting a time-shift function, and a broadcasting receive enabling of the same.

DISCLOSURE

Technical Problem

In order to solve the above mentioned problems, an object of the present invention is to provide an operating method of a broadcasting receiver in which a user is allowed to understand a channel-switched broadcasting program during a storing, when a channel is switched during the storing of the broadcasting program in the broadcasting receiver, and a broadcasting receiver enabling of the method.

Another object of the present invention is to provide an operating method of a broadcasting receiver in which a user's convenience is improved by providing information on what a channel-switched program is as well as simply extracting and outputting thumbnail images from a program at a predetermined time interval by providing a representative thumbnail image during the storing of a broadcasting program, and a broadcasting receiver enabling of the method.

Another object of the present invention is to provide an operating method of a broadcasting receiver in which a user can be provided with information on a channel-switched broadcasting program during a time-shift, while minimizing computation capacity and storage capacity rendered in generating a program representative thumbnail, by generating and outputting the program representative thumbnail using additional information of a broadcasting program according to the present invention, and a broadcasting receiver enabling of the method.

Another object of the present invention is to provide an operating method of a broadcasting receiver in which a user can more conveniently and diversely understand a channel-switched broadcasting program during the storing thereof by outputting a program representative thumbnail in diverse methods, and a broadcasting receiver enabling of the method.

Technical Solution

According to one aspect of the present invention, there is provided an operating method for recording a broadcasting program, comprising: storing a first broadcasting program received from a predetermined tuner in a storage device and sequentially extracting first thumbnail images from the first broadcasting program; when a channel is switched during the storing of the first broadcasting program, storing the channel-switched second broadcasting program in the storage device and sequentially extracting second thumbnail images from the second broadcasting program; and outputting the first thumbnail images, a program representative thumbnail of the second broadcasting program, and the second thumbnail images.

According to another aspect of the present invention, there is provided a broadcasting receiver, comprising: a storage device that stores a first broadcasting program received from a predetermined tuner and, when a channel is switched during the storing of the first broadcasting program, stores the channel-switched second broadcasting program; a thumbnail image extracting module that extracts first thumbnail images from the first broadcasting program and stores the first thumbnail images in the storage device and when the channel is switched during the storing of the first broadcasting program, sequentially extracts second thumbnail images from the channel-switched second broadcasting program and stores the second thumbnail images in the storage device; a program representative thumbnail generation module that generates a program representative thumbnail of the second broadcasting program; and an output module that outputs the first thumbnail images, the program representative thumbnail of the second broadcasting program, and the second thumbnail images.

Advantageous Effects

The present invention provides a representative thumbnail image of a channel-switched broadcasting program during the storing of the broadcasting program, making it possible to improve a user's convenience by providing information on what the channel-switched broadcasting program is as well as by simply extracting and outputting thumbnail images from the broadcasting program at a predetermined time interval.

Also, the present invention generates and outputs a program representative thumbnail using additional information on a broadcasting program, making it possible to provide a user with information on channel-switched broadcasting program during a time-shift, while minimizing computation capacity and storage capacity rendered in generating the program representative thumbnail.

Also, the present invention outputs a program representative thumbnail in diverse methods, making it possible for a user to more conveniently and diversely understand a channel-switched broadcasting program during the storing.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

601: TUNER
620: STORAGE DEVICE
603: THUMBNAIL IMAGE EXTRACTING MODULE
604: PROGRAM REPRESENTATIVE THUMBNAIL GENERATION MODULE
605: OUTPUT MODULE
606: DISPLAY UNIT

BEST MODE

Hereinafter, an operating method of a broadcasting receiver storing a broadcasting program according to the present invention and a broadcasting receiving enabling of the method will be described in detail with reference to the accompanying drawings.

Figure 1:
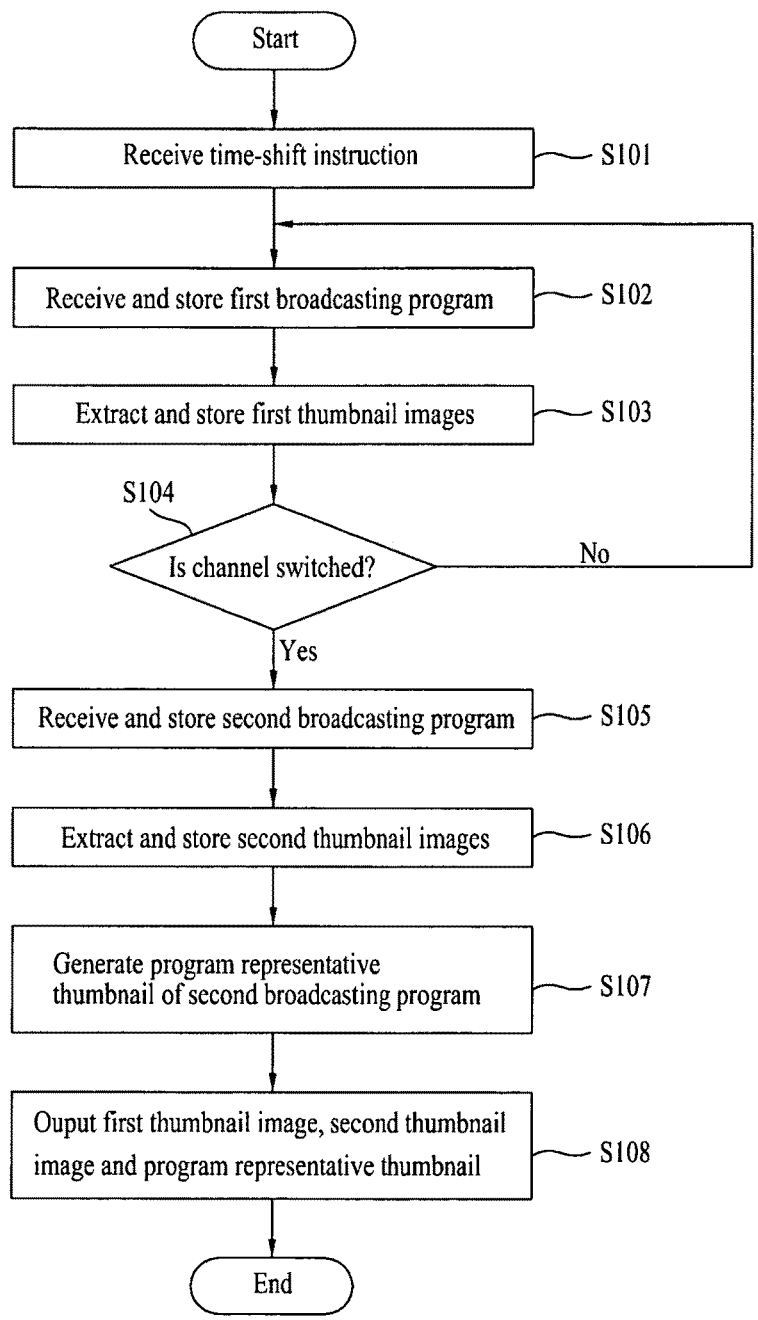
FIG. 1 is a view showing an operating process of a broadcasting receiver according to an embodiment of the present invention.

FIG. 1 is a view showing an operating process of a broadcasting receiver according to an embodiment of the present invention.

Referring to FIG. 1, the broadcasting receiver according to the present invention receives a time-shift instruction in a step (S101) and then stores a first broadcasting program received from a predetermined tuner in a storage means in a step (S102).

At this time, the broadcasting receiver may delay the first broadcasting program by a predetermined time and store it in a predetermined storage device, corresponding to the time-shift instruction.

The storage device included in the broadcasting receiver includes all devices capable of storing predetermined data. For example, the storage device may be a hard disk driver (HDD).

In a step (S103), the broadcasting receiver sequentially extracts first thumbnail images from the first broadcasting program.

At this time, after reading the broadcasting program in the storage device, the broadcasting receiver extracts the images of the broadcasting program at a predetermined time interval to enable to generate the first thumbnail images, wherein the first thumbnail images may be generated in diverse sizes according to embodiments.

In a step (S104), the broadcasting receiver determines whether a channel is switched during the storing of the broadcasting program.

As a result of the determination in the step (S104), when the channel is switched during the storing of the first broadcasting program, the broadcasting receiver stores a channel-switched second broadcasting program in the storage device in a step (S105).

In a step (S106), the broadcasting receiver sequentially extracts second thumbnail images from the channel-switched second broadcasting program.

At this time, after reading the broadcasting program in the storage, the broadcasting receive extracts the images of the second broadcasting program at a predetermined time interval to enable to generate the second thumbnail images, wherein the first thumbnail images may be generated in diverse sizes according to embodiments.

In a step (107), the broadcasting receiver generates a program representative thumbnail of the second broadcasting program.

The program representative thumbnail, which is an image that generated in order for a user to easily identify the switched broadcasting program, may be transmitted by being included in additional information of the broadcasting program or may be generated and output by using additional information of the broadcasting program in the broadcasting receiver according to embodiments.

For example, a broadcasting station may transmits program representative thumbnails for each broadcasting program included in the additional information and the broadcasting receiver may extract an output the program representative thumbnail of the second broadcasting program from the additional information of the second broadcasting program.

The additional information related to the broadcasting program may include Program and System Information Protocol (PSIP) information of the Advanced Television Systems Committee (ATSC) system and System Information (SI) information of a Digital Video Broadcasting (DVB) system, etc.

The program representative thumbnails for each broadcasting program may be transmitted as the additional information and may be stored in separate additional information data or in the HDD according to embodiments.

Also, for example, when the program representative thumbnails are not included in the additional information of the broadcasting program, the broadcasting receiver may generate the program representative thumbnails.

For example, the broadcasting receiver generate the program representative thumbnail using at least one of broadcasting channels, broadcasting program titles, broadcasting time and broadcasting detailed information included in the additional information of the second broadcasting program.

In a step (S108), the broadcasting receiver outputs the first thumbnail image, the program representative thumbnail of the second broadcasting program, and the second thumbnail images.

At this time, the broadcasting receiver outputs the program representative thumbnail of the second broadcasting program between the first thumbnail images and the second thumbnail images.

Figure 2:
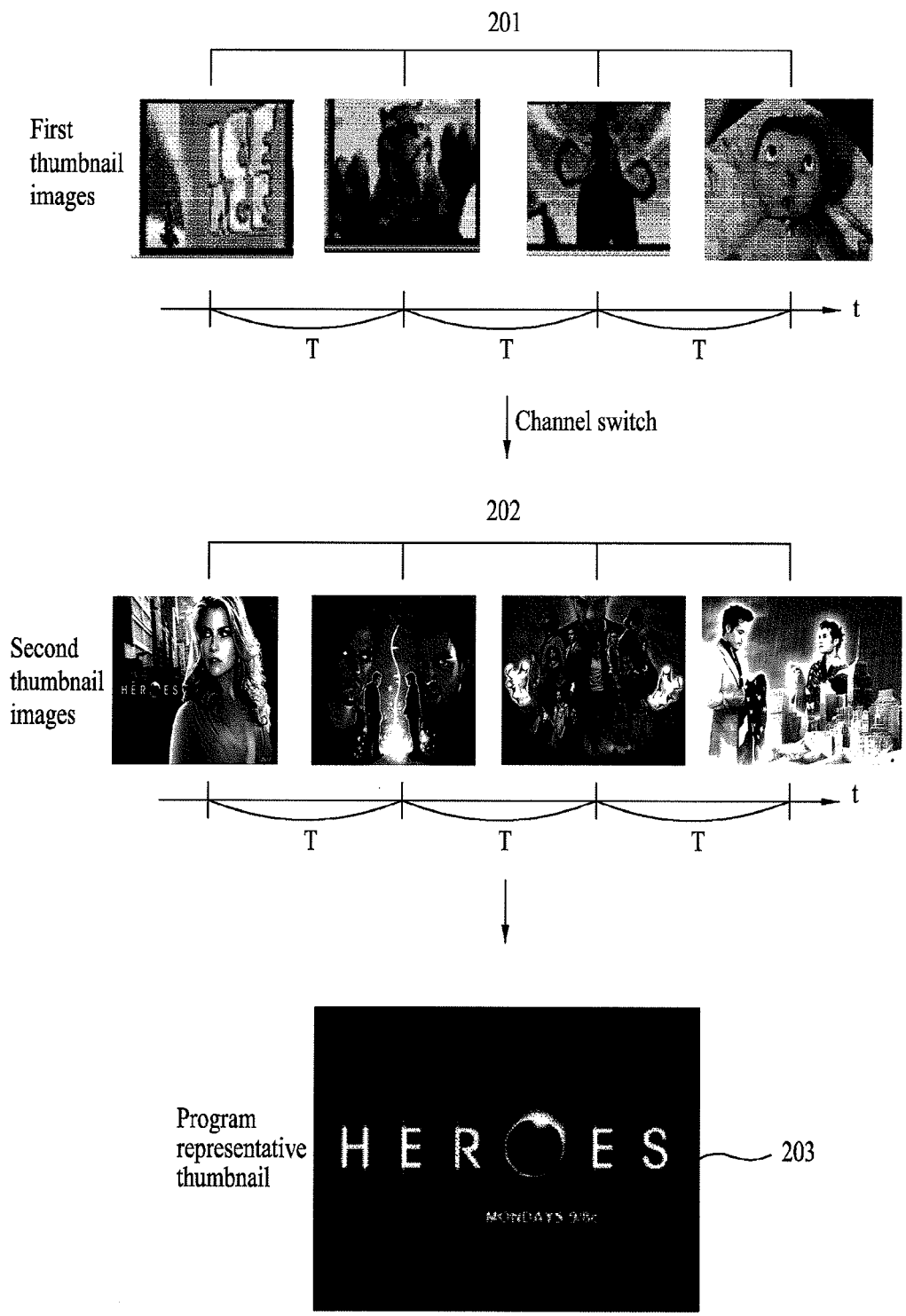
FIG. 2 is a view showing an embodiment in which first thumbnail images and second thumbnail images are extracted, and a program representative thumbnail of a second broadcasting program is generated according to the present invention.

FIG. 2 is a view showing an embodiment in which first thumbnail images and second thumbnail images are extracted, and a program representative thumbnail of a second broadcasting program is generated according to the present invention.

Referring to FIG. 2, the broadcasting receiver sequentially extracts the first thumbnail images 201 from the first broadcasting program according to a time-shift instruction. When the channel is switched during the storing of the first broadcasting program, the second thumbnail images 202 are sequentially extracted from the channel-switched second broadcasting program.

At this time, the program representative thumbnail 203 of the second broadcasting program is generated or extracted for guiding the channel-switched broadcasting program.

Figure 3:
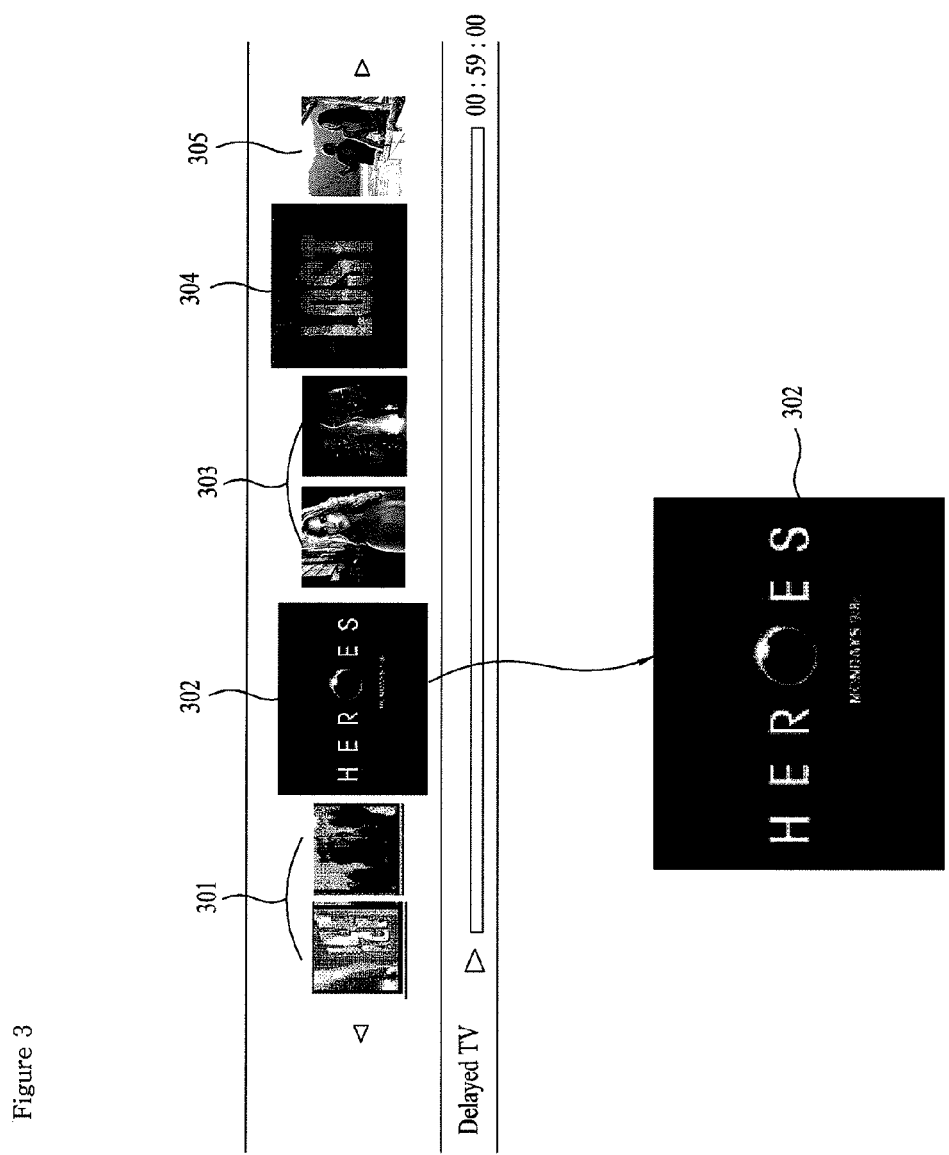
FIG. 3 is a view showing an embodiment in which first thumbnail images, second thumbnail images and a program representative thumbnail are output according to the present invention.

FIG. 3 is a view showing an embodiment in which first thumbnail images, second thumbnail images and a program representative thumbnail are output according to the present invention.

Referring to FIG. 3, the broadcasting receiver according to the present invention outputs the first thumbnail images 301 extracted from the first broadcasting program, the second thumbnail images 303 extracted from the second broadcasting program, and the program representative thumbnail 302 of the second broadcasting program. At this time, a process bar showing the process of the broadcasting program may also be output.

For example, when a user views the first broadcasting program and then changes a channel to the second broadcasting program (for example, 'HEROES', after selecting the time-shift instructions, the broadcasting receiver may extract the representative thumbnail of the second broadcasting program from the additional information or may generate and output the representative thumbnail of the second broadcasting program using the additional information.

In the same manner, when a user switches a channel to store a third broadcasting program, after selecting the second broadcasting program, the broadcasting receiver may also output third thumbnail images 305 of the third broadcasting program and a program representative thumbnail 304 of the third broadcasting program.

The program representative thumbnail may be displayed to be distinguished from the first thumbnail images or the second thumbnail images according to embodiments.

For example, the program representative thumbnail may be displayed to be distinguished from the thumbnail images by enlarging the size, inserting a border, differing the color of the border or including texts.

Figure 4:
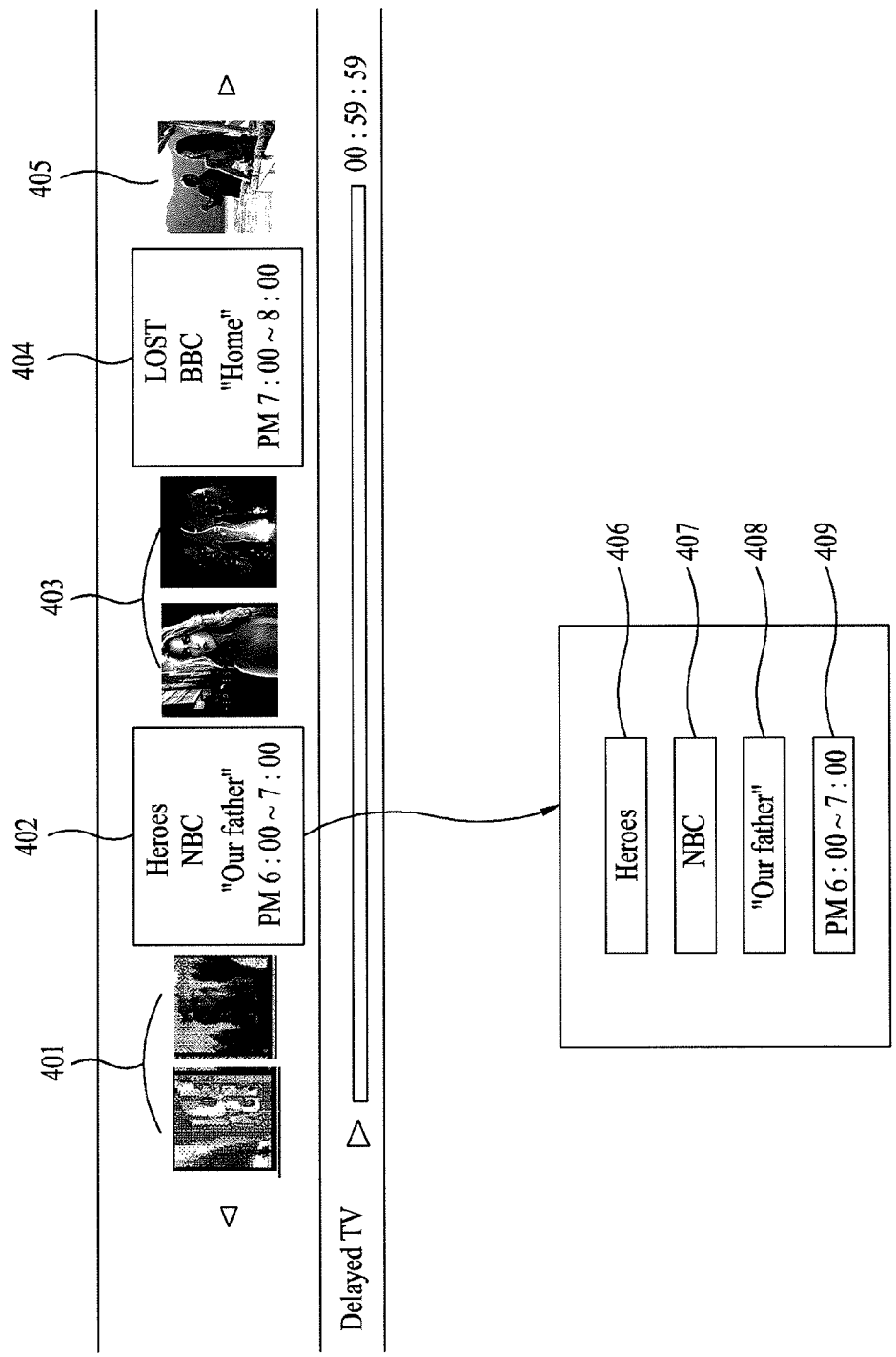
FIG. 4 is a view showing another embodiment in which first thumbnail images, second thumbnail images and a program representative thumbnail are output according to the present invention.

FIG. 4 is a view showing another embodiment in which first thumbnail images, second thumbnail images and a program representative thumbnail are output according to the present invention;

Referring to FIG. 4, the broadcasting receiver according to the present invention outputs the first thumbnail images 401 extracted from the first broadcasting program, the second thumbnail images 403 extracted from the second broadcasting program, and the program representative thumbnail 402 of the second broadcasting program.

At this time, a process bar showing the process of the broadcasting program may also be output.

The program representative thumbnail 402 shown in FIG. 4 may be generated by the broadcasting receiver using the additional information, wherein it may be generated using at least one of broadcasting channels, broadcasting program titles, broadcasting time and broadcasting detailed information included in the additional information of the second broadcasting program.

For example, when a user views the first broadcasting program and then changes a channel to the second broadcasting program (for example, 'HEROES', after selecting the time-shift instructions, the broadcasting receiver may extract the representative thumbnail of the second broadcasting program 'HEROES' from the additional information or may generate and output the representative thumbnail of the second broadcasting program using the additional information.

In other words, when the channel is switched to the second broadcasting program during the storing of the first broadcasting program, the broadcasting receiver may generate the program representative thumbnail 402 including the program title 'HEROES' 406, the broadcasting channel 'NBC' 407, the sub-title of the broadcasting detailed information 'Our Father' 408, and the broadcasting time 'pm 6:00~7:00' 409 to additionally output the program representative thumbnail 402 prior to the second thumbnail images of the second broadcasting program.

In the same manner, when a user switches a channel to store a third broadcasting program, after selecting the second broadcasting program, the broadcasting receiver may also generate a program representative thumbnail 404 of the third broadcasting program prior to third thumbnail images 505 of the third broadcasting program to output the program representative thumbnail 404.

Therefore, with the present invention, when a user switches a channel during the storing of the broadcasting program using the time-shift function, the program representative thumbnail of the channel-switched broadcasting program is output so that the user can easily understand what broadcasting program is stored during the time-shift, making it possible to improve the user's convenience.

Also, the present invention generates and outputs the program representative thumbnail using the additional information, making it possible to provide the user with the information on the channel-switched broadcasting program during the time-shift, while minimizing computation capacity and storage capacity rendered in generating the program representative thumbnail.

Also, the present invention outputs the program representative thumbnail in diverse methods, making it possible for a user to more conveniently and diversely understand the channel-switched broadcasting program during the storing thereof.

Also, the broadcasting receiver according to another embodiment of the present invention may output the extracted or generated program representative thumbnail in a list of the recorded broadcasting programs.

Figure 5:
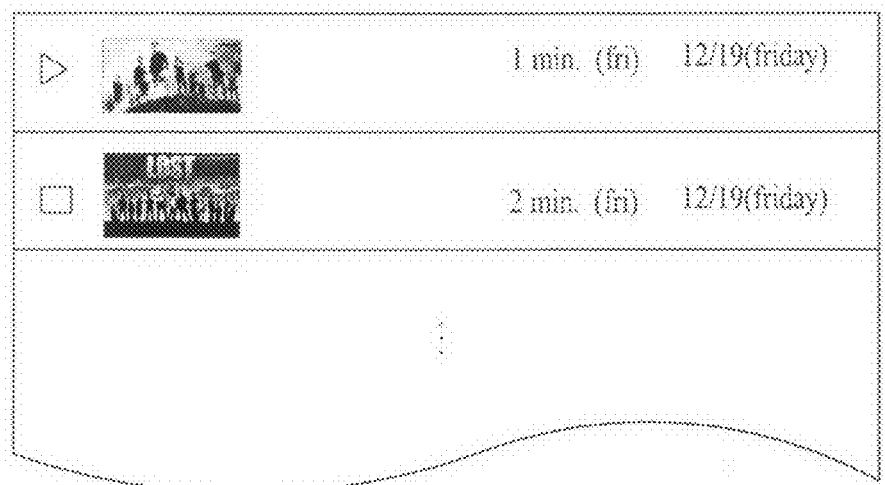
FIG. 5 is a view showing an embodiment in which a program representative thumbnail in a list of the recorded broadcasting programs is output according to the present invention.

FIG. 5 is a view showing an embodiment in which a program representative thumbnail in a list of the recorded broadcasting programs is output according to the present invention.

Referring to FIG. 5, when the list of the recorded broadcasting programs using the time-shift function is output, the broadcasting receiver outputs the program representative thumbnail together with recording information (recording time and recorded period, etc.) of each broadcasting program to allow a user to easily know what broadcasting program is recorded.

Figure 6:
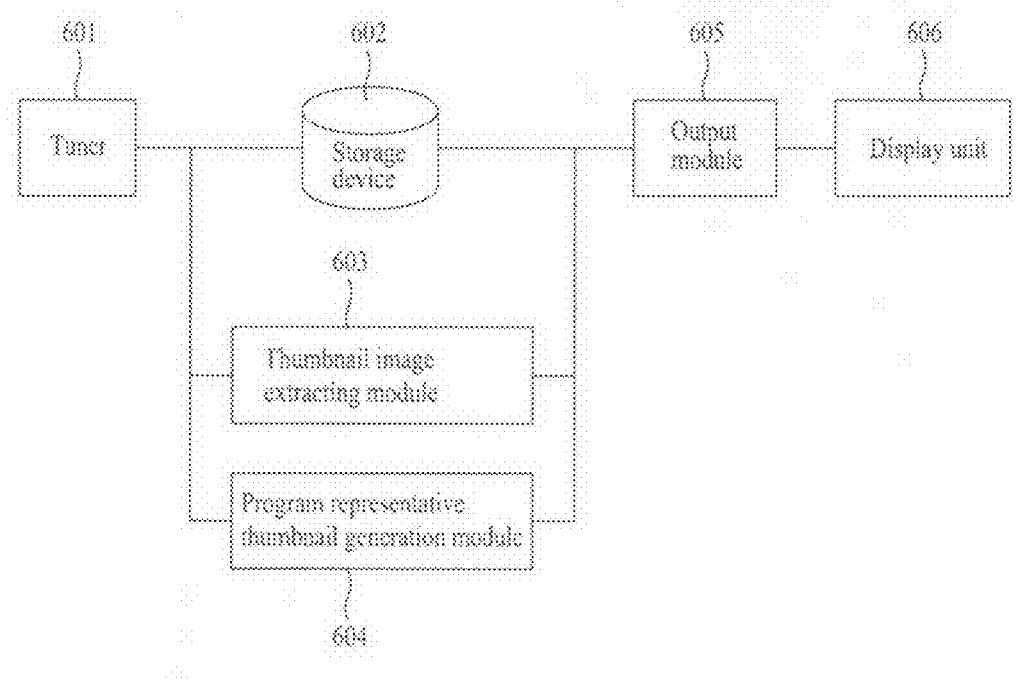
FIG. 6 is a block view showing a constitution of a broadcasting receiver according to an embodiment of the present invention.

FIG. 6 is a block view showing a constitution of a broadcasting receiver according to an embodiment of the present invention.

Referring to FIG. 6, the broadcasting receiver according to the embodiment of the present invention includes a tuner 601, a storage device 602, a thumbnail image extracting module 603, a program representative thumbnail generation module 604, an output module 606, and a display unit 606.

The tuner 601 receives a broadcasting program channel selected by a user.

The storage device 602 stores a first broadcasting program from a predetermined tuner and, when a channel is switched during the storing of the first broadcasting program, stores the channel-switched second broadcasting program.

The thumbnail image extracting module 603 extracts first thumbnail images from the first broadcasting program and stores the first thumbnail images in the storage device and, when the channel is switched during the storing of the first broadcasting program, sequentially extracts second thumbnail images from the channel-switched second broadcasting program and stores the second thumbnail images in the storage device.

The program representative thumbnail generation module 604 generates a program representative thumbnail of the second broadcasting program.

At this time, the program representative thumbnail generation module 604 may extract the program representative thumbnail of the second broadcasting program using additional information of the second broadcasting program.

At this time, the program representative thumbnail generation module 604 may generate the program representative thumbnail using at least one of broadcasting channels, broadcasting program titles, broadcasting time, and broadcasting detailed information included in the additional information of the second broadcasting program.

The output module 605 outputs the first thumbnail images, the program representative thumbnail of the second broadcasting program, and the second thumbnail images. The embodiment regarding the thumbnail images output from the output module 605 and the program representative thumbnail has been already described with reference to FIGS. 3 and 4.

The output module 605 may output the program representative thumbnail of the second broadcasting program between the first thumbnail images and the second thumbnail images. Also, the program representative thumbnail can be displayed to be distinguished from the first thumbnail images or the second thumbnail images, as have been described above.

Also, the output module 605 may output the program representative thumbnail in a list of the recorded broadcasting program. The embodiment in which the program representative thumbnail in a list of the recorded broadcasting programs is output has been already described with reference to FIG. 5.

The broadcasting receiver according to the present invention has been described so far and the technical contents described in the aforementioned embodiments may be applied to the broadcasting receiver in FIG. 6 as they are so that the detailed description thereof will be omitted.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An operating method for recording a broadcasting program, comprising:
   storing a first broadcasting program received from a predetermined tuner in a storage device and sequentially extracting first thumbnail images from the first broadcasting program;
   storing a second broadcasting program in the storage device and sequentially extracting second thumbnail images from the second broadcasting program;
   generating first and second program representative thumbnails of the first and second broadcasting programs using additional information of the first and second broadcasting programs; and
   outputting sequentially, the program representative thumbnail of the first broadcasting program, two first thumbnail images, the program representative thumbnail of the second broadcasting program, and two second thumbnail images,
   wherein the first and second program representative thumbnails are displayed to be distinguished from the first and second thumbnails, and
   wherein the program representative thumbnail represents information of each broadcasting program, program title, program channel information, additional program information, and time information of program.

2. The operating method according to claim 1, further comprising:
   outputting the program representative thumbnail in a list of recorded broadcasting programs.

3. A broadcasting receiver, comprising:
   a storage device configured to store a first broadcasting program received from a predetermined tuner;
   a thumbnail image extracting module configured to
      extract first thumbnail images from the first broadcasting program,
      store the first thumbnail images in the storage device,
      extract second thumbnail images from the second broadcasting program, and
      store the second thumbnail images in the storage device;
   a program representative thumbnail generation module configured to generate a program representative thumbnail of the first and second broadcasting programs using additional information of the first and second broadcasting programs; and
   an output module configured to output sequentially the program representative thumbnail of the first broadcasting program, two first thumbnail images, the program representative thumbnail of the second broadcasting program, and two second thumbnail images,
   wherein the first and second program representative thumbnails are displayed to be distinguished from the first and second thumbnail images,
   wherein the program representative thumbnail is displayed to be distinguished from the first thumbnail images or the second thumbnail images by displaying a larger sized thumbnail than the first thumbnail images or the second thumbnail images, and
   wherein the program representative thumbnail represents information of each broadcasting program, program title, program channel information, additional program information, and time information of the program.

\* \* \* \* \*